United States Patent
Miuchi et al.

(10) Patent No.: US 10,349,670 B2
(45) Date of Patent: Jul. 16, 2019

(54) METHOD FOR MASKING CURCUMIN FLAVOR

(75) Inventors: Takeshi Miuchi, Toyonaka (JP);
Katsuya Tokuno, Toyonaka (JP);
Masashi Oda, Toyonaka (JP);
Masayuki Nishino, Toyonaka (JP)

(73) Assignee: SAN-EI GEN F.F.I., INC., Osaka (JP)

( * ) Notice: Subject to any disclaimer, the term of this patent is extended or adjusted under 35 U.S.C. 154(b) by 0 days.

(21) Appl. No.: 13/084,810

(22) Filed: Apr. 12, 2011

(65) Prior Publication Data

US 2011/0274809 A1  Nov. 10, 2011

Related U.S. Application Data

(60) Provisional application No. 61/324,983, filed on Apr. 16, 2010.

(51) Int. Cl.
*A23L 2/58* (2006.01)
*A23L 27/00* (2016.01)
*A23L 5/44* (2016.01)

(52) U.S. Cl.
CPC .............. *A23L 27/84* (2016.08); *A23L 2/58* (2013.01); *A23L 5/44* (2016.08); *A23V 2250/2112* (2013.01); *A23V 2250/5118* (2013.01)

(58) Field of Classification Search
CPC .......... A23L 1/22075; A23L 1/27; A23L 2/52; A23L 2/58; A23L 27/84; A23L 5/40; A23L 5/42; A23L 5/43; A23L 5/44; C09B 61/00; A23V 2250/2112
See application file for complete search history.

(56) References Cited

U.S. PATENT DOCUMENTS

| | | | | |
|---|---|---|---|---|
| 3,528,823 A | * | 9/1970 | Rossen | 426/606 |
| 4,999,205 A | * | 3/1991 | Todd, Jr. | 426/250 |
| 5,114,720 A | * | 5/1992 | Littell et al. | 424/478 |
| 5,460,823 A | * | 10/1995 | Jensen et al. | 424/451 |
| 5,922,355 A | * | 7/1999 | Parikh et al. | 424/489 |
| 6,011,016 A | * | 1/2000 | Schmidt et al. | 514/23 |
| 6,020,003 A | * | 2/2000 | Stroh et al. | 424/489 |
| 2002/0127303 A1 | * | 9/2002 | Chen et al. | 426/89 |
| 2006/0292250 A1 | * | 12/2006 | Giampapa | A61K 31/7008 424/756 |
| 2007/0154554 A1 | * | 7/2007 | Burgermeister et al. | 424/486 |

FOREIGN PATENT DOCUMENTS

| | | |
|---|---|---|
| EP | 2 011 835 | 1/2009 |
| JP | 2002020278 A | 1/2002 |
| JP | 2006-111534 | 4/2006 |
| JP | 2006347948 A | 12/2006 |
| JP | 2007244325 A | 9/2007 |
| JP | 2009-28042 A1 | 2/2009 |
| WO | 2004099255 A1 | 11/2004 |
| WO | 2009/007273 | 1/2009 |

OTHER PUBLICATIONS

Verghese, Isolation of Curcumin from Curcuma Jonga L. Rhizome; Flavour and Fragrance Journal, vol. 8, 315-319 (1993).*
Curcumin, prepared at 61st JECFA (2003) and published in FNP 52 Add 11, (2003).*
Yu et al., "Enhanced in vitro anti-cancer activity of curcumin encapsulated in hydrophobically modified starch", *Food Chemistry*, Mar. 2010, vol. 119, pp. 669-674.
Wang, et al., "Study on microencapsulation of curcumin pigments by spray drying" *European Food Research & Technology*, 2009, vol. 229, pp. 391-396.
Tønnensen, H. H., et al.; "Studies on Curcumin and Curcuminoids"; *Z Lebensm Unters Forsch*; (1985); 180:402-404.
Tayyem RF, et al.; "Curcumin content of turmeric and curry powders" (Abstract); *Nutr Cancer*; (2006); 55(2):126-31.
Chinese Office Action dated Jul. 3, 2013, in the corresponding Chinese patent application No. 201180019304.7, with English translation.
Liao, Zheng-gen, et al., "The Mechanism of Bitter Formation and Advances in Studies on. Bitter Taste Masking Technology of TCM," Lishizhen Medicine and Materia Medica Research, vol. 19, No. 5 (2008), pp. 1276-1278.
Tayyem, Reema F., et al.; "Curcumin Content of Turmeric and Curry Powders"; Nutrition and Cancer, 55(2) (2006), pp. 126-131.
Extended European Search Report dated Sep. 9, 2013, in the corresponding European patent application No. 11768805.1.
Paramera, Efstathia, et al., "Stability and release properties of curcumin encapsulated in *Saccharomyces cerevisiae*, β-cyclodextrin and modified starch," Food Chemistry, vol. 125, No. 3 (2011), pp. 913-922.
Dubey, Rama, et al., "Microencapsulation Technology and Applications," Defence Science Journal, vol. 59, No. 1 (2009), pp. 82-95.
Office Action dated Nov. 4, 2015 for the corresponding JP application No. 2012-510644.
Office Action issued in Korean Patent Application No. 10-2012-7029525 dated Mar. 29, 2018, with English translation.

* cited by examiner

*Primary Examiner* — Walter A Moore
(74) *Attorney, Agent, or Firm* — Hamre, Schumann, Mueller & Larson, P.C.

(57) ABSTRACT

An object of the present invention is to improve the smell, flavor and the like peculiar to curcumine by masking. The present invention provides a method for masking curcumine flavor comprising mixing curcumine with a modified starch.

11 Claims, No Drawings

METHOD FOR MASKING CURCUMIN FLAVOR

A CROSS REFERENCE OF RELATED APPLICATIONS

This application claims priority to U.S. provisional patent application 61/324,983 filed on Apr. 16, 2010, the entire contents of which are incorporated by reference herein.

TECHNICAL FIELD

The present invention relates to a method for masking the unfavorable flavor of curcumin to obtain a preparation that can be taken without resistance.

BACKGROUND ART

Turmeric (Turmeric, *Curcuma longa* L.) is a foodstuff that has been widely used as a natural food additive or a spice. Various foods and beverages containing turmeric are available in the marketplace. It has recently been reported that turmeric has an antioxidant effect, an antiinflammatory effect, and an anticarcinogenic effect, and turmeric has been attracting attention as a functional natural material. Turmeric comprises curcumin as a yellow main component, and research on its bioactivity is being conducted.

However, because turmeric has a peculiar flavor, many people tend to avoid consuming it.

Therefore, there is a tendency for people to widely use curcumin, i.e., the yellow main component described above, rather than a turmeric extract. Maltodextrin, cyclodextrin, trehalose and the like have been used as masking agents for turmeric (Patent Literature 1); however, these masking agents still have room for improvement in their flavor masking effects.

CITATION LIST

Patent Literature

PTL 1: Japanese Unexamined Patent Publication No. 2009-28042

SUMMARY OF INVENTION

Technical Problem

An object of the present invention is to improve the scent, flavor (bitterness, smell) and the like peculiar to curcumin by the use of masking.

Solution to Problem

The present inventors conducted research aimed at finding a method for masking the flavor that is peculiar to curcumin to reduce people's resistance to consuming curcumin so that the functions possessed by turmeric or curcumin can be utilized. As a result, the inventors found that the flavor of curcumin can be effectively masked by using a modified starch as a masking agent, and adding it to curcumin. The present invention has been accomplished based on this finding.

Specifically, the present invention provides the following items.

Item 1. A method for masking curcumin flavor comprising: mixing curcumin with a modified starch.

Item 2. The method for masking curcumin flavor according to Item 1, wherein the amount of modified starch is 0.01 to 10 parts by mass per 1 part by mass of curcumin.

Item 3. The method for masking curcumin flavor according to Item 1 or 2, wherein the modified starch is at least one member selected from the group consisting of acetylated distarch adipate, acetylated oxidized starch, acetylated distarch phosphate, oxidized starch, hydroxypropyl starch, hydroxypropyl distarch phosphate, carboxymethyl starch, starch acetate, starch octenyl succinate, monostarch phosphate, distarch phosphate, and phosphated distarch phosphate.

Item 4. A method for preparing a curcumin composition comprising mixing a modified starch with curcumin in order to mask the flavor of curcumin.

Advantageous Effects of Invention

The invention provides foods and beverages having a reduced curcumin-peculiar flavor by adding curcumin and a modified starch that serves as a masking agent to the foods and beverages.

DESCRIPTION OF EMBODIMENTS

Method for Masking Curcumin Flavor

The present invention provides a method for masking curcumin flavor comprising a step of mixing curcumin with a modified starch.

The modified starches used in the present invention can be obtained by using corn, potato, sweet potato, wheat, rice, glutinous rice, tapioca, sago palm and like starches as raw materials, and subjecting these starches to a chemical treatment that can be roughly classified into the two categories of decomposition treatment and addition treatment. These raw material starches may be used singly or in a combination of two or more. Preferable examples of raw material starches include corn and tapioca. Examples of known kinds of corns include dent corn (*Zea mays* Linn. var. indentata Sturt), flint corn (*Zea mays* Linn. var. indurata Sturt), soft corn (*Zea mays* Linn. var. amylacea Sturt), sweet corn (*Zea mays* Linn. var. saccharata Sturt), popcorn (*Zea mays* Linn. var. everta Sturt) and glutinous corn (waxy corn, *Zea mays* Linn. var. ceratina Sturt). There is no particular limitation to the type of corn used in the present invention and any type of corn can be used as a raw material starch. Preferably the starch is derived from glutinous corn, i.e., waxy corn (hereafter simply referred to as "waxy corn").

Examples of modified starches usable in the present invention include starches obtainable by processing the raw material starches mentioned above, specifically, acetylated distarch adipate, acetylated oxidized starch, acetylated distarch phosphate, oxidized starch, hydroxypropyl starch, hydroxypropyl distarch phosphate, carboxymethyl starch, starch acetate, starch octenyl succinate, monostarch phosphate, distarch phosphate, phosphated distarch phosphate and the like. Among these, hydroxypropyl starch, hydroxypropyl distarch phosphate and starch octenyl succinate are preferable and starch octenyl succinate is particularly preferable. These modified starches may be used singly or in a combination of two or more.

According to the present invention, by adding the modified starch to curcumin, the flavor of curcumin can be masked.

The amount of modified starch relative to curcumin is not particularly limited, and generally 0.01 to 10 parts by mass, and preferably 0.1 to 10 parts by mass of modified starch is added per 1 part by mass of curcumin.

As the preferable examples for adding the modified starch of the present invention to curcumin, the modified starch and curcumin may be formed into a composition, and the modified starch and curcumin may be added to foods and beverages. Furthermore, curcumin and a modified starch may be formed into a preparation.

The curcumin used as the raw material for the masking method of the present invention is preferably used in a form contained in a turmeric pigment or a turmeric extract.

The curcumin used in the present invention is that obtainable from the rhizome of Curcuma longa LINNE.

Preferably, the curcumin is that obtained by subjecting dried turmeric rhizome (turmeric powder) to extraction using warmed ethanol, using a heated oil or fat or propylene glycol, or using room-temperature to heated hexane or acetone. Crystalline curcumin is more preferable. Crystalline curcumin can be obtained by extracting turmeric powder using hexane and acetone, subjecting the resulting extract to filtration, and drying it to volatilize the solvent. Alternatively, synthesized products may be used.

Conventionally, commercially available turmeric pigments (curcumin powder: crystalline) can be used. Such curcumin powders are available from San-Ei Gen F.F.I., Inc., etc.

Preferably, the modified starch is first dissolved in a solvent to form a modified starch solution, and then curcumin is added to and mixed with the modified starch solution. The solvents used to dissolve the modified starch are not limited as long as they can be added to foodstuffs and do not dissolve curcumin. Preferable examples thereof include water, and mixed solvents of water and solvents compatible with water. Examples of solvents compatible with water include ethanol and like lower alcohols; propylene glycol, glycerin and like polyhydric alcohols; fructose-glucose solutions, sucrose solutions, isomerized sugar solutions and like sugar solutions; crystalline fructose; etc. In this specification, these solvents are collectively referred to as a "hydrous solvent". The modified starch solutions, in which the modified starch described above is dissolved in such a solvent, are collectively referred to as a "modified starch hydrous solution".

The modified starch is dissolved in a hydrous solvent (preferably water) in such a manner that the ultimate concentration becomes 0.00001 to 20 mass %, preferably 0.0001 to 15 mass %, and more preferably 0.001 to 10 mass %. Subsequently, curcumin is added to the modified starch hydrous solution thus obtained and then mixed.

The method for mixing the modified starch hydrous solution with curcumin is not particularly limited as long as they can be mixed, and the mixing can be performed by agitation using a conventional agitator. For example, mixing can be performed by adding curcumin to a modified starch hydrous solution, followed by agitation using a propeller stirrer or the like. The temperature for the mixing by agitation is not particularly limited, and can be set, for example, within the range of 1 to 100° C. The duration of the mixing by agitation is not particularly limited as it depends on the scale of the production, and can be set, for example, within the range of 1 to 60 minutes. The agitation speed is not particularly limited as it also depends on the scale of the production, and can be set, for example, at within the range of 1 to 3,000 rpm.

The mixture of modified starch hydrous solution and curcumin after undergoing mixing by agitation may subsequently be supplied to a grinding treatment (pulverization).

The grinding treatment (pulverization) is preferably conducted by a physical crushing method. One example of a physical crushing method is that performed by using a wet grinding mill. Specific examples of wet grinding mills include the Ultra visco mill and Dyno-Mill. Wet grinding mills such as a sand mill and a Co-ball mill can also be used by inserting beads and the like as modifications.

The curcumin liquid composition obtained by adding curcumin to a modified starch hydrous solution or grinding curcumin in a modified starch hydrous solution may be further subjected to homogenization, if necessary, in order to homogeneously mix the pulverized turmeric pigment and other components. The homogenization method is not particularly limited as long as it can homogeneously disperse the curcumin and other components, and can be conducted using an emulsification and dispersion apparatus such as a nanomizer, microfluidizer and homogenizer, or an ultrasonic dispersion apparatus. The conduction of homogenization loosens the aggregation of curcumin, further increasing its dispersibility to water and dispersion stability in water.

The pH may be suitably controlled depending on the target product to which the curcumin liquid composition will be added (e.g., the target product to be colored (herein referred to as a product to be colored)). Preferably, the pH value is controlled to be 8 or lower. Examples of pH adjusters include phosphoric acid, sulfuric acid, hydrochloric acid and like inorganic acids; and citric acid, lactic acid, malic acid and like organic acids. These pH adjusters may be suitably selected depending on the type of product to be colored, and the targeted pH.

A curcumin composition in a powder form (hereafter referred to as a curcumin powder composition) can be prepared, if necessary, by drying and powderizing the curcumine liquid composition obtained by the aforementioned method. The curcumin powder composition thus obtained is advantageous in that it is useful to prepare a product that contains curcumin with an extremely high concentration; it can be used to produce a dry product, such as a food or a tablet, with a dry method; it is highly preservable without requiring the addition of a preservative; etc. The dryer used in the drying and powderization is not particularly limited, and examples thereof include a spray dryer, a slurry dryer and like spray dryers; a freeze dryer; etc.

By further subjecting the curcumin powder composition to granulation or subsequent tableting, if necessary, the curcumin composition can be formed into granules (curcumin granular compositions) or tablets (curcumin tablet composition). Such granules and tablets can be produced by adding additives known in the art (e.g., excipient, binder, lubricant, disintegrator, etc.) if necessary, according to a conventional preparation technique. In particular, a curcumin composition having a granular form is advantageous in that it exhibits high solubility and promptly dissolves when it is added to an aqueous product such as a beverage or a cosmetic lotion.

Insofar as the effect of the invention can be achieved, a polysaccharide thickener, flavoring agent, pigment, antioxidant, shelf life extenders, preservative, saccharide and like additives may be used together with the curcumin composition. By using these additives, the taste, scent, and texture of the curcumin composition can be changed, allowing a more palatable curcumin composition to be prepared.

Method for Preparing a Curcumin Composition

The present invention provides a method for preparing a curcumin composition characterized in that a composition is obtained by mixing a modified starch with curcumin, thus masking the curcumin flavor.

The modified starch and curcumin used in the method of the present invention, and the method for preparing a curcumin composition, can employ the same conditions as those of the masking method described above.

Use of Curcumin Composition (1) Use as a Food Additive or Additive

The curcumin composition of the present invention is usable, for example, as a food additive or an additive. More specifically, the curcumin composition of the present invention can be used as a flavoring agent or a coloring agent in various food products (including general food products (which also include health foods) and supplements such as dietary supplements), and cosmetics.

The foods may be in any form of liquid, semi solid, or solid, and specific examples thereof are as listed below.

Beverages (e.g., carbonated beverages, fruit beverages (including fruit juices, fruit juice-containing soft drinks, fruit juice-containing carbonated beverages, fruit pulp-containing beverages), vegetable beverages, vegetable/fruit beverages, low-alcohol beverages, coffee beverages, powdered beverages, sport drinks, supplement beverages, black tea beverages, green teas, blended teas, etc.); desserts (e.g., custard puddings, milk puddings, fruit juice-containing puddings, jelly, Bavarian cream, etc.); frozen desserts (e.g., ice cream, milk ice cream, fruit juice-containing ice cream, soft ice cream, ice candies, sorbets, etc.); gum (e.g., chewing gum, bubble gum, etc.); chocolates (e.g., marble chocolate and like coating chocolates, strawberry chocolate, blueberry chocolate, melon chocolate, etc.); candies (e.g., hard candies (including bon-bons, butter balls, marbles, etc.)), soft candies (including caramel, nougat, gummy candy, marshmallows, etc.), drops, toffee, etc.); other confections (e.g., baked confections such as hard biscuits, cookies, okaki (rice crackers), senbei (rice crackers), etc.); soups (e.g., consomme soups, potage soups, pumpkin soups, etc.); tsukemono (Japanese pickles, e.g., asa-zuke, shoyu-zuke, shio-zuke, miso-zuke, kasu-zuke, koji-zuke, nuka-zuke, su-zuke, karashi-zuke, moromi-zuke, ume-zuke, fukujin-zuke, shiba-zuke, shoga-zuke, umezu-zuke, etc.); jams (e.g., strawberry jam, blueberry jam, marmalade, apple jam, apricot jam, etc.); milk products (e.g., milk beverages, lactic fermented milk drinks), yogurt, cheese, etc.); oil or fat-containing food products (e.g., butter, margarine, etc.); processed grain foods (e.g., breads, noodles, pasta, etc.); processed fish or animal food products (e.g., ham, sausage, kamaboko, chikuwa, etc.); seasonings (e.g., miso, tare (Japanese style sauces), sauces, bottled lemon juice, vinegar, mayonnaise, salad dressings, curry roux, etc.); cooked food products (e.g., tamago-yaki (Japanese omelets), omelets, curry, stew, hamburger patties, croquette, soups, okonomi-yaki (pan cakes with vegetables, meat or seafood), gyoza (fried or boiled dumplings), fruit jam, etc.).

Among these, beverages, jams, tsukemono, and liquid seasonings belonging to the sauce category are preferable, and beverages are particularly preferable. In the case of dietary supplements and like supplements, syrups, liquids and solutions, drinkable preparations, tablets, pills, powders, granules, and capsules are preferable.

When the curcumin composition of the present invention is used as a food additive or additive (coloring agent or flavoring agent), the product to be colored or flavored (e.g., foods, beverages, and cosmetics) can be produced by adding the curcumin composition of the present invention as a coloring agent or a flavoring agent in any step of producing the target product. Such a product can be produced according to a conventional method except that the aforementioned step is added.

In this case, the amount of the curcumin composition is not particularly limited as long as it serves the desired purpose. When coloring is the goal, specifically, the curcumin composition of the present invention may be added in such an amount that its proportion relative to the final product becomes 0.01 mass % at minimum.

Here, an example of known curcumin (a conventional curcumin composition) is a liquid, solubilized curcumin composition that can be obtained by extracting curcumin powder by hydrous ethanol using the crude curcumin and production method disclosed in the List of Existing Food Additives (Appendix 1 for Labeling and Specifications under the Food Sanitation Law in Notice No. 56, published May 23, 1996, by the Director-General of the Environmental Health Bureau, Ministry of Health and Welfare).

(2) Use as a Functional Component

When the bioactive function of curcumin is targeted, the curcumin composition of the present invention itself can be used as supplements such as dietary supplements.

In this case, the curcumin composition of the present invention can be formed into "orally administered curcumin preparations", i.e., orally administrable preparations, such as hard capsules, soft capsules, tablets, granules, powders, fine granules, pills, troches, syrups, liquids and solutions, drinkable preparations, etc.

In this case, the dosage of the curcumin composition of the present invention (an orally administered curcumin preparation) depends on the consumer's age, body weight and condition, dosage form, duration of treatment and the like. According to the Technical Report from WHO, the ADI (Acceptable Daily Intake) of curcumin is 0 to 3 mg/kg of body weight/day, and the NOAEL (no-observed-adverse-effect level) is 250 to 320 mg/kg of body weight/day (WHO Technical Report Series: page 33). Therefore, the curcumin composition can be administered at one time or divided into several times within this range.

The present invention is explained in detail below with reference to Production Examples, Examples, Comparative Examples and the like. However, the present invention is not limited to these examples. Note that the unit used in the formulation is "part by mass" unless otherwise specified.

EXAMPLES

Production Example 1

Method for Preparing Curcumin Composition 60 g of starch octenyl succinate (Purity BE, produced by Nippon NSC Ltd.) was added to 830 g of water as a modified starch, and the mixture was then heated to 90° C. to obtain an aqueous solution. Subsequently, 110 g of curcumin powder (curcumin powder No. 3705, produced by San-Ei Gen F.F.I., Inc., crystalline, curcumin content of 88.3%) was added to the resulting aqueous solution, followed by dispersive mixing. The amount of dispersion water was adjusted to obtain a mass of 1,000 g.

The mixture containing curcumin powder dispersed therein was supplied to a wet type mill (dyno-mill, DYNO-Mill KDL: produced by Willy A. Bochofen AG Maschinenfabrik) to perform wet grinding. Thereafter, the ground mixture was subjected to homogenization by dispersion one time using a homogenizer (high pressure homogenizer, model 15MR-8TA: produced by APV Gaulin Inc.) at room temperature and a pressure of 20 MPa to obtain a curcumin preparation in a liquid form. (a liquid curcumin preparation). The average particle diameter (particle size distribution (D50)) was 0.22 μm.

Production Example 2

Preparation of Powder Curcumin Composition 83 g of Dextrin NSD-C (produced by Nissi Co., Ltd.) was added to 119 g of water. The mixture was heated to 60° C. to homogeneously dissolve the dextrin. 100 g of the curcumin composition prepared in Production Example 1 was added to the mixture, followed by homogenization using a homogenizer. The homogenized mixture was then subjected to dry powderization using a spray dryer (produced by Tokyo Rikakikai Co, Ltd.). The resulting powder (curcumin powder composition) had a curcumin content of 9.7%.

Test Example 1

Objective

Using the curcumin powder composition described above that was prepared using a modified starch, the curcumin flavor improvement effect was examined (Example 1). As Comparative Examples, the curcumin compositions disclosed in Japanese Unexamined Patent Publication No. 2009-28042 were prepared according to the formulations shown in Table 1 and the Preparation Method 1 described below to investigate the flavor improvement effects (Comparative Examples 1 to 4).

TABLE 1

Formulations

|  | Example 1 | Comparative Example 1 | Comparative Example 2 | Comparative Example 3 | Comparative Example 4 | Blank |
| --- | --- | --- | --- | --- | --- | --- |
| Crystalline fructose | 7.5 | 7.5 | 7.5 | 7.5 | 7.5 | 7.5 |
| Citric acid | 0.2 | 0.2 | 0.2 | 0.2 | 0.2 | 0.2 |
| Sodium citrate | 0.05 | 0.05 | 0.05 | 0.05 | 0.05 | 0.05 |
| Curcumine composition (Curcumine content: 9.7%) | 0.62 | | | | | |
| Bulk curcumine powder (Curcumine content: 88.3%) | | 0.068 | 0.068 | 0.068 | 0.068 | 0.068 |
| Gellan gum (stabilizer) | | 0.03 | 0.03 | 0.03 | 0.03 | 0.03 |
| Maltodextrin | | 0.5 | 1 | | | |
| Cyclodextrin | | 0.5 | | 1 | | |
| Trehalose | | | | | 1 | |
| Adding ion-exchanged water (to result in 100%) | 100 | 100 | 100 | 100 | 100 | 100 |

Details of Starting Materials

Crystalline fructose: Krystar 300, produced by Danisco A/S curcumin composition: Curcumin powder preparation (Curcumin content: 9.7%, modified starch content: 6%)

Bulk curcumin powder: Curcumin powder No. 3705 (produced by San-Ei Gen F.F.I., Inc., curcumin content: 88.3%)

Gellan gum: Kelcogel LT-100, produced by CP Kelco

Maltodextrin: Sunmalt (Midori), produced by Hayashibara Co., Ltd.

Cyclodextrin: Dexypearl K-100, produced by Ensuiko Sugar Refining Co., Ltd.

Preparation Method 1

Gellan gum, crystalline fructose, citric acid, and sodium citrate were heated at 90° C. for 10 minutes to prepare an aqueous solution in advance. Subsequently, maltodextrin, cyclodextrin, and trehalose were added and dissolved in the aqueous solution. A curcumin composition or bulk curcumin powder was added to the resulting solution, followed by hot packing at 93° C.

Sensory Evaluation 1

Four panelists (A to D) evaluated the differences in the flavors of the samples from that of a blank solution.
Evaluation Scale:
5: Similar to the blank solution
4: A very small improvement in curcumin flavor compared to the blank solution
3: Some improvement in curcumin flavor compared to the blank solution
2: A significant improvement in curcumin flavor compared to the blank solution
1: A remarkable improvement in curcumin flavor compared to the blank solution

TABLE 2

|  | Example 1 | Comparative Example 1 | Comparative Example 2 | Comparative Example 3 | Comparative Example 4 |
| --- | --- | --- | --- | --- | --- |
| A | 1 | 4 | 5 | 4 | 5 |
| B | 2 | 4 | 4 | 4 | 5 |
| C | 1 | 3 | 4 | 3 | 4 |
| D | 2 | 4 | 5 | 4 | 5 |
| Average | 1.5 | 3.75 | 4.5 | 3.75 | 4.75 |

Result 1

As the above results show, an apparent improvement in flavor was confirmed when the curcumin composition of Example 1 was used.

Test Example 2

The flavor improvement effect was examined by changing the amount of modified starch contained. Specifically, curcumin compositions were prepared into the formulations shown in Table 3 according to Preparation Method 2 described below to investigate the flavor improvement effect (Comparative Examples 2 to 5).

TABLE 3

|  | Example 2 | Example 3 | Example 4 | Example 5 | Blank |
| --- | --- | --- | --- | --- | --- |
| Crystalline fructose | 7.5 | 7.5 | 7.5 | 7.5 | 7.5 |
| Citric acid | 0.2 | 0.2 | 0.2 | 0.2 | 0.2 |
| Sodium citrate | 0.05 | 0.05 | 0.05 | 0.05 | 0.05 |
| Bulk curcumine powder (Curcumine content: 88.3%) | 0.068 | 0.068 | 0.068 | 0.068 | 0.068 |

TABLE 3-continued

|  | Example 2 | Example 3 | Example 4 | Example 5 | Blank |
|---|---|---|---|---|---|
| Gellan gum | 0.03 | 0.03 | 0.03 | 0.03 | 0.03 |
| Modified starch | 0.6 | 0.06 | 0.006 | 0.0006 |  |
| Adding ion-exchanged water (to result in 100%) | 100 | 100 | 100 | 100 | 100 |

Preparation Method 2

Gellan gum (Kelcogel LT-100, produced by CP Kelco), crystalline fructose (Krystar 300, produced by Danisco A/S), citric acid, sodium citrate, and modified starch (Purity BE, produced by Nippon NSC Ltd.) were heated at 90° C. for 10 minutes to prepare an aqueous solution in advance. Bulk curcumin powder was added to the aqueous solution in the proportions shown in Table 3 while stirring at 1,000 rpm. The resulting curcumin-containing compositions were hot packed at 93° C.

Sensory Evaluation 2

Differences in the flavors from a blank solution were evaluated using the same method and evaluation scale as in Sensory Evaluation 1 in Test Example 1. Table 4 shows the results.

TABLE 4

|  | Example 2 | Example 3 | Example 4 | Example 5 |
|---|---|---|---|---|
| A | 2 | 2 | 3 | 4 |
| B | 2 | 3 | 3 | 3 |
| C | 2 | 2 | 3 | 3 |
| D | 2 | 3 | 3 | 4 |
| Average | 2 | 2.5 | 3 | 3.5 |

Result 2

An improvement in curcumin flavor was confirmed in Examples 2 to 5 in which the proportion of modified starch was 0.01 to 10 parts by mass relative to 1 part by mass of curcumin.

Test Example 3

The flavor improvement effect was examiner by changing the kind of modified starch contained.

TABLE 5

|  | Example 6 | Example 7 | Blank |
|---|---|---|---|
| Crystalline fructose | 7.5 | 7.5 | 7.5 |
| Citric acid | 0.2 | 0.2 | 0.2 |
| Sodium citrate | 0.05 | 0.05 | 0.05 |
| Bulk curcumine powder (Curcumine content: 88.3%) | 0.068 | 0.068 | 0.068 |
| Gellan gum | 0.03 | 0.03 | 0.03 |
| Hydroxypropyl starch | 0.6 |  |  |
| Hydroxypropyl distarch phosphate |  | 0.6 |  |
| Adding ion-exchanged water (to result in 100%) | 100 | 100 | 100 |

Preparation Method 3

Curcumin-containing compositions were prepared in the same manner as in Example 2 (Preparation Method 2) except that hydroxypropyl starch (National 7, produced by Nippon NSC Ltd.) or hydroxypropyl distarch phosphate (Purity 87, produced by Nippon NSC Ltd.) was used as the modified starch instead of starch octenyl succinate (Purity BE, produced by Nippon NSC Ltd.) (Examples 6 and 7).

Sensory Evaluation 3

Differences in the flavors from the blank solution were evaluated using the same method and evaluation scale as in Sensory Evaluation 1 in Test Example 1. Table 6 shows the results.

TABLE 6

|  | Example 6 | Example 7 |
|---|---|---|
| E | 3 | 4 |
| F | 3 | 3 |
| G | 4 | 3 |
| H | 3 | 3 |
| Average | 3.25 | 3.25 |

Result 3

An improvement in curcumin flavor was also continued in the cases where hydroxypropyl starch or hydroxypropyl distarch phosphate was used instead of the modified starch (Purity BE, produced by Nippon NSC Ltd.).

The invention claimed is:

1. A method of preparing a curcumin composition comprising:
    mixing crystalline curcumin with a modified starch that has been dissolved in a hydrous solution; and
    subsequent to the mixing, pulverizing the crystalline curcumin in the obtained mixture,
    wherein an amount of the modified starch in the hydrous solution including the modified starch is in a range from 0.00001 to 15% by mass relative to the hydrous solution including the modified starch,
    an amount of the modified starch is in a range from 0.01 to 0.618 parts by mass relative to 1 part by mass of the curcumin, and
    peculiar flavor of the curcumin is masked in the composition to be at a level at which the curcumin in the curcumin composition is taken without resistance to the peculiar flavor by a panelist for a sensory testing when the curcumin composition is added to an aqueous solution in an amount of 0.62%.

2. The method of preparing a curcumin composition according to claim 1,
    wherein the modified starch is at least one starch selected from the group consisting of acetylated distarch adipate, acetylated oxidized starch, acetylated distarch phosphate, oxidized starch, hydroxypropyl starch, hydroxypropyl distarch phosphate, carboxymethyl starch, starch acetate, starch octenyl succinate, monostarch phosphate, distarch phosphate, and phosphated distarch phosphate.

3. The method of preparing a curcumin composition according to claim 1 further comprising, subsequent to the pulverizing, homogenizing the resultant curcumin suspension.

4. The method according to claim 1, further comprising adjusting pH of the curcumin composition to pH 8 or lower,
    wherein the adjusting pH of the curcumin composition is performed when the curcumin composition is in a state of not being included in a product to be colored or flavored or fortified with the curcumin composition.

5. The method according to claim 1, wherein the pH of the curcumin composition is adjusted with at least one pH adjusting agent selected from the group consisting of phosphoric acid, sulfuric acid, hydrochloric acid, citric acid, lactic acid, and malic acid.

6. The method according to claim 1, wherein the hydrous solution is water or a mixture of water and a water-compatible solvent.

7. The method according to claim 1, wherein the amount of the modified starch in the hydrous solution including the modified starch is in a range from 0.001 to 15% by mass relative to the hydrous solution including the modified starch.

8. The method according to claim 1, wherein the modified starch is dissolved in a hydrous solution under heating.

9. A method of masking peculiar flavor of crystalline curcumin comprising:
    mixing crystalline curcumin with a modified starch, which has been dissolved in a hydrous solution, so as to form a mixture of the crystalline curcumin and the modified starch, whereby the modified starch masks the peculiar flavor of the curcumin,
    wherein an amount of the modified starch in the hydrous solution including the modified starch is in a range from 0.00001 to 15% by mass relative to the hydrous solution including the modified starch,
    an amount of the modified starch is in a range from 0.01 to 0.618 parts by mass relative to 1 part by mass of the crystalline curcumin, and
    the peculiar flavor of the crystalline curcumin in the food is masked to be at a level at which the curcumin in the mixture of the curcumin and the modified starch is taken without resistance to the peculiar flavor by a panelist for a sensory testing when the mixture of the curcumin and the modified starch is formed and added to an aqueous solution in an amount of 0.62%.

10. A process of producing a curcumin-containing food whose peculiar flavor of curcumin is masked comprising:
    mixing the curcumin with a modified starch that has been dissolved in a hydrous solution so as to form a curcumin composition, and
    adding the curcumin composition to a food in a form of liquid, semi solid, or solid so that a curcumin-containing food is produced,
    wherein an amount of the modified starch in the hydrous solution including the modified starch is in a range from 0.00001 to 15% by mass relative to the hydrous solution including the modified starch,
    an amount of the modified starch is in a range from 0.01 to 0.618 parts by mass relative to 1 part by mass of the curcumin, and
    the peculiar flavor of the curcumin in the food is masked to be at a level at which the curcumin in the curcumin composition is taken without resistance to the peculiar flavor by a panelist for a sensory testing when the curcumin composition is added to an aqueous solution in an amount of 0.62%.

11. The process according to claim 10,
    wherein the food is a beverage, and
    the curcumin-containing food is a curcumin-containing beverage.

* * * * *